United States Patent [19]
Ayers, Jr.

[11] 3,717,382
[45] Feb. 20, 1973

[54] DEVICE FOR DUAL BRAKE SYSTEMS
[75] Inventor: David T. Ayers, Jr., Birmingham, Mich.
[73] Assignee: Kelsey-Hayes Company, Romulus, Mich.
[22] Filed: Nov. 13, 1970
[21] Appl. No.: 89,340

[52] U.S. Cl................303/6 C, 188/151 A, 188/349, 200/82 D, 303/84 A, 340/52 C
[51] Int. Cl..........B60t 8/26, B60t 11/34, B60t 17/22
[58] Field of Search .188/151 A, 349; 303/6 C, 84 A; 60/54.5 E; 200/82 D; 340/52 C

[56] References Cited

UNITED STATES PATENTS

| 3,608,977 | 9/1971 | Kersting | 188/349 X |
| 3,480,333 | 11/1969 | Stelzer | 303/6 C |
| 3,464,741 | 9/1969 | Falk | 303/6 C |
| 3,597,008 | 8/1971 | Falk | 303/6 C |
| 3,586,384 | 6/1971 | Falk | 303/6 C |
| 3,597,014 | 8/1971 | Stokes | 188/349 X |
| 3,597,015 | 8/1971 | Stokes | 303/6 C |

Primary Examiner—Trygve M. Blix
Assistant Examiner—John J. McLaughlin
Attorney—Harness, Dickey & Pierce

[57] ABSTRACT

A valve device for a hydraulic brake system of the type incorporating a dual master cylinder for separately pressurizing the front and rear brakes of a vehicle including a pressure proportioning valve for proportioning the brake pressure delivered to the rear brakes, a metering valve for controlling the pressure delivered to the front brakes, a bypass valve for bypassing the proportioning valve in the event of a loss of fluid pressure in the front brake system, and a switch for indicating the loss of either the front or rear brake pressure.

10 Claims, 2 Drawing Figures

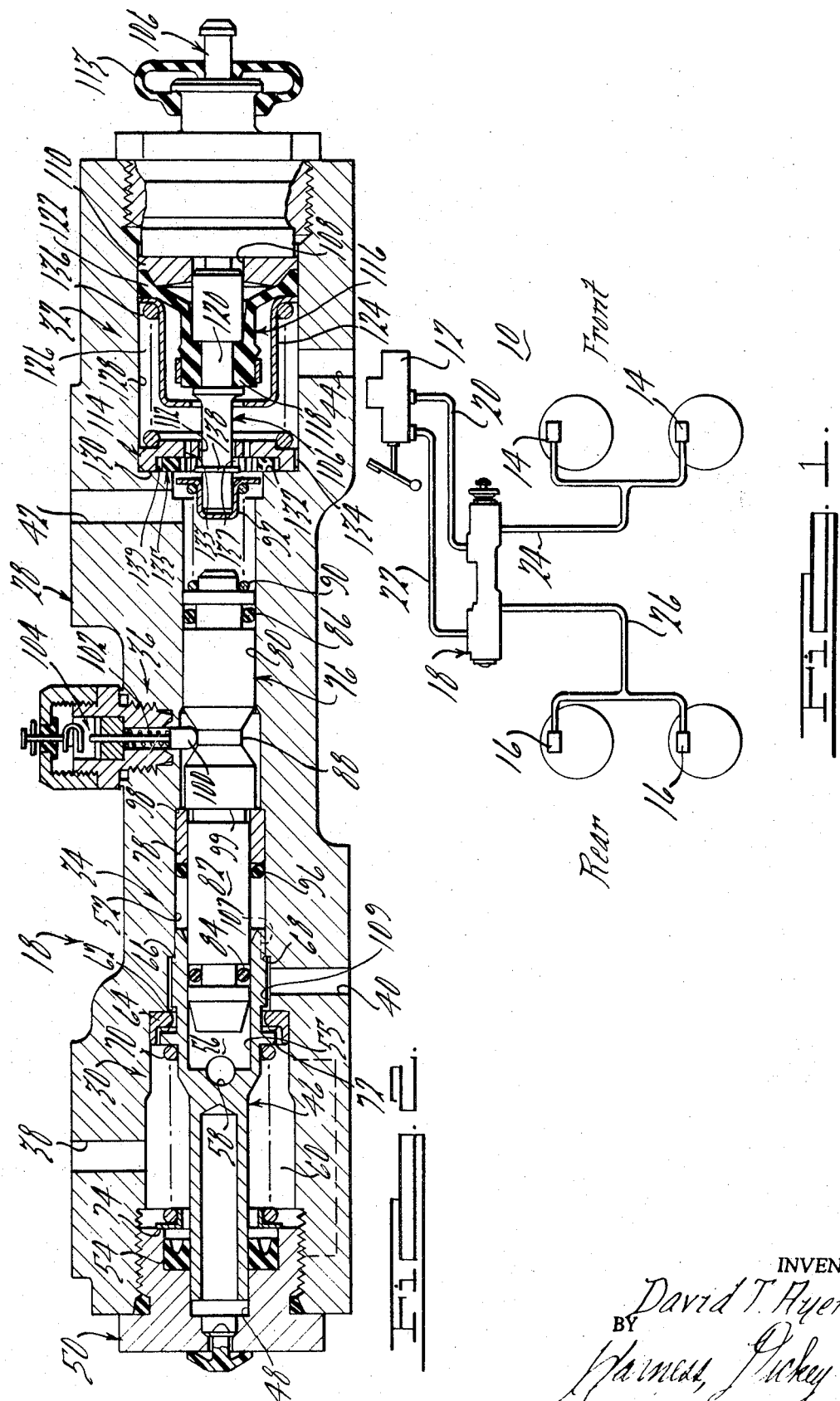

DEVICE FOR DUAL BRAKE SYSTEMS

SUMMARY AND BACKGROUND OF THE INVENTION

In recent years, the use of brake systems having dual master cylinders with separate hydraulic circuits to the front and rear brakes in combination with disc front brakes and drum rear brakes has resulted in increased sophistication in brake system implementation. Particularly, a brake system of the above type may have a metering valve for controlling the fluid pressure delivered to the disc front brakes and a proportioning valve for controlling the fluid pressure delivered to the drum rear brakes. Additionally, a bypass valve is desired which will override the proportioning valve in the event of failure of the front brake system. Still additionally, a device is required for indicating failure of either the front or rear brake systems. Often several separate components are used to provide the above functions. The present invention provides a single device accomplishing all of the above functions which has axially aligned movable elements to provide an exceptionally straight forward construction.

BRIEF DESCRIPTION OF THE DRAWINGS

FIG. 1 is a generally schematic diagram depicting the valve device of the present invention in a hydraulic brake system for an automotive vehicle; and FIG. 2 is a longitudinal cross-sectional view of an exemplary apparatus according to the present invention.

DETAILED DESCRIPTION OF THE PREFERRED EMBODIMENT

In FIG. 1, a brake system 10 is illustrated including the usual master cylinder at 12, front wheel brake cylinders at 14, and rear wheel brake cylinders at 16. In the contemplated use of the apparatus of the present invention, the front brakes are disc type whereas the rear brakes are drum type. Interposed between the master cylinder 12 and the front and rear brake cylinders 14 and 16 is a brake valve and failure warning device 18. The master cylinder 12 is of the type which separately pressurizes the front and rear brakes of the vehicle by means of a front brake outlet line 20 and a rear brake outlet line 22 connected to respective front and rear inlet openings in the valve device 18. The device 18 delivers fluid pressure to the front brake cylinders 14 via a line 24 and to the rear brake cylinders 16 via a line 26. The device 18 has a housing 28 which contains a proportioning valve assembly 30, a metering valve assembly 32, a bypass valve assembly 34, and a brake failure indicator 36. Line 22 is connected to a rear brake inlet opening 38 in the housing to receive rear brake master cylinder pressure while the rear brake line 26 is connected to a rear brake outlet opening 40. The housing 28 also has a front brake inlet opening 42 connected to the line 20 to receive front brake master cylinder pressure and a front brake outlet opening 44 connected to the front brake line 24.

The proportioning valve assembly 30 is interposed between the rear brake inlet 38 and the rear brake outlet 40 for modulating the transmission of fluid pressure to the rear brakes above a predetermined master cylinder pressure or "split point" in a conventional manner. To this end, the proportioning valve assembly 30 is provided with a differential area piston 46 which is slidably journaled at its left end within a bore 48 of an end closure member 50 for the housing 28. The end closure member 50 is provided with a fluid seal 54 which sealingly engages the cylindrical body of the differential area piston 46. The differential area piston 46 has a bore at its right end providing a chamber 56 which communicates through a radial opening 58 in the differential area piston 46 with a chamber 60 formed by a main proportioning valve bore in the housing 28, and in turn, with the rear brake inlet opening 38. The differential area piston 46 is provided with a radially extending shoulder 62 intermediate its ends which is adapted to engage a valve seat member 64 upon leftward axial movement of the differential area piston 46. The differential area piston has a radial shoulder 66 which is resiliently urged against a radial shoulder 68 on The housing 28 by a compressed coiled spring member 70 which abuts a radial shoulder 72 on a differential area piston 46 at its one end and a spring seat member 74 at its other end. The spring seat member 74 is restrained from leftward movement by abutting engagement with the end closure member 50. According to the practice in the art, the differential area piston 46 has surface areas exposed to fluid pressure at the inlet opening 38 which face toward the right which are greater in total surface area than the surface areas exposed to the brake inlet pressure at inlet 38 which face to the left. Accordingly, fluid braking pressure delivered to the inlet port 38 causes a resultant force tending to move the differential area piston 46 to the left against the resilient bias of the spring 70. When a predetermined fluid inlet pressure is reached, the differential area piston 46 will overcome the preload of the spring 70 and move leftward to engage the radial shoulder 62 with the valve seat member 64 to interrupt the transmission of full fluid pressure from the inlet port 38 to the outlet port 40. As the fluid brake pressure at the inlet port 38 continues to increase, the radial shoulder 62 is moved into and out of engagement with the valve seat member 64 so as to modulate the fluid pressure delivered to the rear brakes in the conventional manner. A more detailed explanation of the operation of a proportioning valve may be found in the U.S. Pat. to Stelzer, No. 3,423,936 issued Jan. 28, 1969, the disclosure of which is incorporated herein by reference.

The bypass valve 34 includes a detent member 76 which is journalled in a bushing 78 and a bore 80 of the housing 28 so that it is slidably carried for axial movement within the housing 28. The bushing 78 is axially slidable with the bore 52. The detent member 76 is additionally slidably carried within the bore 55 of the differential area piston 46 at a left end portion 82. The left end portion 82 of the detent member 76 has an O-ring 84 sealingly engaging the bore 55 of the differential area piston 46 while the right end of the detent member 76 has an O-ring 86 sealingly engaging the bore 80 of the housing 28. The detent member 76 is further provided with a detent portion 88 for purposes to be described. As can be seen in the drawings, the bore 80 communicates with the front brake inlet opening 42 so that the right end of the detent member 76 is exposed to front brake pressure delivered by the master cylinder 12 whereas the left end of the detent member 76 is exposed to rear brake pressure delivered by the master cylinder 12 in the aforementioned chamber 56. The detent member 76 is resiliently biased to the left by a coiled spring member 90 abutting the right end of the detent member 76 at its one end and a cup member 92 at its other end. The slidable bushing 78 is provided with an O-ring seal 96 which is biased rightward under the influence of pressure within the bore 52 to abut the sliding bushing 78 against a radial shoulder 98 on the housing 28. The leftward resilient bias of the spring 90 locates a radial shoulder 99 on the detent member 76 against the sliding bushing 78, i.e., at the housing shoulder 98. Normally the leftward and rightward acting forces on the detent member 76 are substantially balanced such that the detent member 76 will remain centered with a plunger 100 of the brake failure indication assembly 36 in the lowest portion of the circumferential detent 88 in the detent number 76. The detent 88 preferably has generally ramp-like sides as shown in FIG. 2. The plunger 100 is resiliently biased downwardly by spring 102 into the detent 88. It will be appreciated that reduction of either the front or rear brake pressure will create a pressure differential across the detent member 76 causing leftward or rightward axial movement, respectively, of the detent member 76. Axial movement of the detent member 76 is effective to cam the plunger 100 upwardly against the ramp sides of the detent 88 to close a pair of contacts 104 of the brake failure warning indicator 36 to provide a brake failure indication to the operator of the vehicle. The operation of a detent member and a brake failure warning assembly of similar construction may be found in the U.S. Pat. to Stelzer, No. 3,480,333, issued Nov. 25, 1969, the disclosure of which is incorporated herein by reference.

The O-ring seal 84 of the left end 82 of the detent member 76 is axially positioned within the bore 55 of the differential area piston 46 when the plunger 100 is residing in the detent 88 to prevent fluid communication from the chamber 56 to the bore portion 52 of the housing 28. However, upon a predetermined rightward axial movement of the detent member 76 in response to a failure of front brake pressure, the O-ring 84 will move rightward and thereby be disengaged with the periphery of the bore 55, whereby inlet fluid pressure in the chamber 56 is communicated to the housing bore portion 52. The right end of the piston 46 is formed with an axially extending radial clearance portion or recessed area, representatively designated at 107 in FIG. 2, which is intended to communicate the interior of the bore portion 52 with an enlarged diameter counterbore 109 arranged in axial alignment and communicable with the outlet opening 40. Thus, it will be seen that at such time as a front brake pressure failure occurs, a fluid transmission passage is provided from the chamber 60, through the opening 58, and the chamber 56 to the bore portion 52, and finally, through the recessed area 107 and counterbore 109 to the outlet port 40, with the result that fluid pressure will be communicated or bypassed to the rear brakes without being subjected to the proportioning or modulating operation of the valve assembly 30.

The metering valve 32 includes a push rod 106 which carries the spring retaining cup 92 at its left end and which is slidably journalled in a bore 108 of plug member 110 and a bore 112 of a valve plate 114. A predetermined clearance is provided between the push rod 106 and the bore 112 for purposes to be explained. The extreme right end of the push rod 106 axially extends outwardly of the housing 28 and is provided with a flexible boot 113 to prevent dirt or other foreign matter from entering the interior of the apparatus 18. A resilient diaphragm 116 has a central portion 118 which engages a reduced cross-section portion 120 of the push rod 106. An outer portion 122 of the diaphragm 116 is secured with respect to the housing 28 by the plug member 110 and a spring retaining cup 124. It can be seen that this construction provides axial movement of the push rod 106 to the right in response to fluid pressure in a chamber 126 formed by a bore portion 128 of the housing 28. The valve plate 114 has a forward seat portion 130 which engages a radial shoulder 132 on the housing 28. The valve plate 114 is provided with a plurality of axially-extending, circumferentially spaced serrations 134 on its periphery and a plurality of axially extending pressure transmission passages 133 through the valve plate 114. The valve plate 114 has a cup shaped recess containing an annular sealing member 135 of resilient material having a plurality of circumferentially-spaced, axially-extending, radially-inward serrations 137 and a plurality of circumferentially-spaced, axially-extending, peripheral serrations 139. When the valve plate 114 is in its leftward position, the annular sealing member 135 sealingly engages the radial shoulder 132 on the housing 28 at its solid, non-serrated portion. Rightward movement of the valve plate 114 and the annular sealing member 135 permits fluid pressure transmission by the annular sealing member 135 and the valve plate 114 through the peripheral serrations 134. Rightward movement of the valve plate 114 is resiliently resisted by a coiled spring member 136 which bears against an insert in the valve plate 114 at its one end and against the spring retaining cup 124 at its other end. The valve plate 114 and the resilient sealing member 135 may be lifted from the shoulder 132 either by a differential pressure across the valve plate 114 and the sealing member 135 or by abutment of a snap ring 138 on the push rod 106. It can be seen in the figure that the flange portion of the cup shaped spring retainer 92 extends radially outward so that rightward axial movement of the push rod 106 causes engagement of the flange with the non-serrated portion of the sealing member 135 to interrupt fluid pressure transmission from the front brake inlet opening 42 to the front brake outlet 44 by blocking the axial openings 133 in the valve plate 114. A similar metering valve assembly is described in more detail in the U.S. Pat. to Stelzer, No. 3,278,241, issued Oct. 11, 1966, and the aforementioned U.S. Pat. to Stelzer, No. 3,480,333, issued Nov. 25, 1969.

Since disc brakes use either no return springs or very light return springs, disc brakes produce a brake torque almost as soon as hydraulic pressure is developed in the system. Drum brakes, on the other hand, require substantial hydraulic pressure in the system before they produce a brake torque since they utilize relatively heavy return springs which must be extended before the shoes contact the drum. If a vehicle is provided with drum brakes on its rear wheels and disc brakes on its front wheels, and no metering valve for the disc brakes is employed, the disc brakes will develop a high braking torque during light brake application. As a result, the linings of the disc brake shoes will tend to wear out prematurely. The metering valve assembly 32 is interposed between the master cylinder and the disc brake cylinder 14 to retard the delivery of fluid pressure to the disc brake cylinders during initial pedal application until the master cylinder pressure reaches a level which is preferably equal to or greater than the pressure at which the force of the drum brake return springs will be overcome, thereby causing the disc brakes to produce a braking torque at the same time or after the drum brakes.

In the operation of the metering valve assembly 32, the master cylinder pressure at the inlet port 42 is delivered to the left surface portion of the diaphragm 116 to move the push rod 106 axially to the right thereby engaging the spring retaining cup 92 with the annular seal member 135 to substantially interrupt fluid pressure communication through the metering valve 32 during the initial application of the brakes. Preferably, the seating of the spring retaining cup on the annular seal 135 occurs before the pressure at the outlet port 44 has reached a level sufficient to actuate the front disc brakes. As the master cylinder pressure at inlet port 42 continues to rise, a pressure differential develops across the annular seal member 135 and the valve plate 114 tending to lift the seal member 135 from the radial shoulder 132. This action continues until the resilient force exerted by the spring member 136 is overcome at which time the annular seal 135 will be lifted from the radial shoulder 132 to provide pressure transmission from the inlet port 42 by the serrations 134, to the outlet port 44. When the annular seal member 135 lifts as described, the master cylinder pressure has developed a force across the seal member 135 and the valve plate 114 just sufficient to overcome the force of the spring 136. When the annular seal member 135 lifts from its seat, the pressure in the chamber 126 increases so as to allow the spring 136 to once again seat the annular seal member 135. The annular seal member 135 remains seated until a further increase in master cylinder pressure is experienced to again overcome the force of the spring member 136. This alternate opening and closing of the metering valve 32 continues until the master cylinder pressure reaches a level whereby the pressure in chamber 126 acting on the diaphragm 116 is sufficient to move the push rod 106 to the right to abut the snap ring 138 on the valve plate 114 and upon further rightward movement of the push rod 106, to move and retain the valve plate 114 and the annular seal member 135 away from the shoulder 132 to maintain the metering valve 32 in the opened position to permit full fluid pressure transmission to the front disc brakes.

From the foregoing description of an exemplary embodiment of a valve device according to this invention for a hydraulic brake system, it will be appreciated that the axial alignment and cooperation of the proportioning valve, bypass valve and metering valve elements provide an exceptionally straight-forward construction which may be easily manufactured.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

I claim:

1. An apparatus for a hydraulic brake system having a master cylinder adapted to separately supply fluid braking pressure for the front and rear brakes of a vehicle comprising:

housing means having a bore located on a predetermined axis, an inlet adapted to receive front fluid braking pressure, an inlet adapted to receive rear braking pressure, an outlet adapted to be connected to the front brakes of the vehicle for supplying braking pressure to the front brakes, and an outlet adapted to be connected to the rear brakes of a vehicle for supplying fluid braking pressure to the rear brakes;

a differential area member coaxially located in said bore for movement therewithin along said predetermined axis for modulating the fluid braking pressure delivered to the rear brakes having a bypass valve portion interposed between said rear brake inlet and said rear brake outlet;

a second member coaxially located in said bore adapted for movement therewithin along said predetermined axis in accord with a predetermined reduction in said front braking pressure relative to said rear braking pressure, said second member including a bypass valve portion cooperating with said bypass valve portion on said differential area member for providing a bypass pressure transmission passage upon said axial movement of said second member whereby substantially full braking pressure is transmitted to the rear brakes upon failure of the front brakes; and a metering valve interposed between said front brake inlet and said front brake outlet for modulating the fluid braking pressure delivered to the front brakes, said metering valve means including a metering valve member coaxially located in said bore for movement therewithin along said predetermined axis to provide a pressure transmission passage from said front brake inlet to said front brake outlet.

2. An apparatus according to claim 1 wherein the bypass valve portion of one of said members includes a bore in the one member and the bypass valve portion of the other of said members is in sealed engagement with said bore to form a chamber within said bore, said apparatus further includes passage means communicating said rear brake inlet with said chamber.

3. An apparatus according to claim 2 wherein said second member has a first surface exposed to the pressure within said chamber and an opposed second surface exposed to front brake pressure whereby failure of said front brake pressure causes a resultant force causing said axial movement of said second member.

4. An apparatus according to claim 3 wherein said one member is said differential area member and wherein said other member is said second member.

5. An apparatus according to claim 4 wherein said axial movement of said second member breaks said sealed engagement between said bypass valve portion of said differential area member and bypass valve portion of said second member to communicate said pressure within said chamber with said rear brake outlet.

6. An apparatus according to claim 3 wherein said axial movement of said second member breaks said sealed engagement between said bypass valve portion of said differential area member and bypass valve portion of said second member to communicate said pressure within said chamber with said rear brake outlet.

7. An apparatus according to claim 1 further including an additional metering valve member which is movable along said predetermined axis in response to fluid braking pressure delivered to the front brakes to maintain said metering valve member in a position providing said pressure transmission passage to the front brakes above a predetermined pressure at said front brake inlet.

8. An apparatus according to claim 7 further including failure indicating means in cooperative relationship with said second member for responding to said axial movement of said second member to provide an indication of loss of front or rear braking pressure.

9. An apparatus according to claim 8 wherein said failure indicating means includes plunger means and said second member includes detent means receiving said plunger means so that said axial movement of said second member provides radial movement of said plunger relative to said bore to provide said fluid pressure failure indication.

10. An apparatus for a hydraulic brake system having a master cylinder adapted to separately supply fluid braking pressure for the front and rear brakes of a vehicle comprising:

housing means having a bore located on a predetermined axis, an inlet adapted to receive front fluid braking pressure, an inlet adapted to receive rear fluid braking pressure, an outlet adapted to be connected to the front brakes of the vehicle for supplying braking pressure to the front brakes, and an outlet adapted to be connected to the rear brakes of a vehicle for supplying fluid braking pressure to the rear brakes;

a differential area member coaxially located in said bore for movement therewithin along said predetermined axis for modulating the fluid braking pressure delivered to the rear brakes said differential area member having a bore therein;

a second member coaxially located in said bore having a first surface exposed to the pressure within said chamber and an opposed second surface exposed to front brake pressure whereby failure of said front brake pressure causing a predetermined reduction in said front braking pressure relative to said rear braking pressure results in a force providing movement of said second member, said second member including a bypass valve portion in sealed engagement with said bore of said differential area member to form a chamber within said bore, said apparatus further includes passage means communicating said rear brake inlet with said chamber, said axial movement of said second member breaking said sealed engagement between said bypass valve portion of said differential area member and said bore of said second member to communicate said pressure within said chamber with said rear brake outlet providing a bypass pressure transmission passage upon said axial movement of said second member whereby substantially full braking pressure is transmitted to the rear brakes upon failure of the front brakes;

a metering valve interposed between said front brake inlet and said front brake outlet for modulating the fluid braking pressure delivered to the front brakes, said metering valve means including a first metering valve member coaxially located in said bore for movement therewithin along said predetermined axis to provide a pressure transmission passage from said front brake inlet to said front brake outlet and a second metering valve member which is axially movable in response to fluid braking pressure delivered to the front brakes to maintain said first metering valve member in a position providing said pressure transmission passage to the front brakes above a predetermined pressure at said front brake inlet; and failure indicating means in cooperative relationship with said second member for responding to said axial movement of said second member to provide an indication of loss of front or rear braking pressure, said failure indicating means including plunger means and detent means in said second member receiving said plunger means so that said axial movement of said member provides radial movement of said plunger relative to said bore to provide said fluid pressure failure indication.

* * * * *

UNITED STATES PATENT OFFICE
CERTIFICATE OF CORRECTION

Patent No. 3,717,382                      Dated  February 20, 1973

Inventor(s) David T. Ayers, Jr.

It is certified that error appears in the above-identified patent and that said Letters Patent are hereby corrected as shown below:

Column 2, line 19, "The" should be --the--. Column 3, line 19, "number" should be --member--.

Signed and sealed this 20th day of November 1973.

(SEAL)
Attest:

EDWARD M. FLETCHER, JR.          RENE D. TEGTMEYER
Attesting Offocer                Acting Commissioner of Patents